United States Patent
Mergen et al.

(10) Patent No.: US 8,316,238 B2
(45) Date of Patent: Nov. 20, 2012

(54) METHOD AND SYSTEM FOR PROVIDING IMAGE PROCESSING TO TRACK DIGITAL INFORMATION

(75) Inventors: John Francis Mergen, Baltimore, MD (US); Carl Marshall Eliot Powell, Gaithersburg, MD (US); Daniel M. Wood, Acton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1196 days.

(21) Appl. No.: 11/552,757

(22) Filed: Oct. 25, 2006

(65) Prior Publication Data

US 2008/0104404 A1 May 1, 2008

(51) Int. Cl.
*H04L 9/32* (2006.01)
(52) U.S. Cl. ........................ 713/176; 713/179
(58) Field of Classification Search .......... 713/168–181, 713/187
See application file for complete search history.

(56) References Cited

U.S. PATENT DOCUMENTS

| | | | | |
|---|---|---|---|---|
| 5,499,294 A * | 3/1996 | Friedman | | 713/179 |
| 6,021,491 A | 2/2000 | Renaud | | |
| 7,111,168 B2 * | 9/2006 | Lofgren et al. | | 713/176 |
| 2002/0154144 A1 | 10/2002 | Lofgren et al. | | |
| 2003/0028796 A1 | 2/2003 | Roberts et al. | | |
| 2003/0084298 A1 * | 5/2003 | Messerges et al. | | 713/176 |
| 2005/0289139 A1 * | 12/2005 | Takashima et al. | | 707/5 |
| 2006/0230081 A1 * | 10/2006 | Craswell et al. | | 707/204 |

FOREIGN PATENT DOCUMENTS

WO    WO-00/33575    6/2000

OTHER PUBLICATIONS

"Intelligent Indexing and Semantic Retrieval of Multimodal Documents." (Srihari et al.), Nov. 1999, Entire document, especially Sections 1, 3, 4, 5.
"Faceted Metadata for Image Search and Browsing." (Yee et al.) Apr. 5, 2003, http://flamenco.berkeley.edu/pubs.html.
"Blobworld: A System for Region-Based Image Indexing and Retrieval." (Carson et al.), Technical Report: CSD-99-1041. 1999.
"Query by Image and Video Content: The QBIC System." (Flickner et al.), Sep. 1995, Computer (vol. 28, No. 9) pp. 23-32.
Cid, at al,, "Recent developments in cryptographic hash functions: Security implications and future directions", Information Security Technical Report, Elsevier Advanced Technology, Amsterdam, NL, vol. 11, No. 2, pp. 100-107, Jan. 1, 2006.
Heintze, "Scalable document fingerprinting", Proceedings of the Usenix Workshop of Electronic Commerce, XX, XX, Jan. 1, 1996, pp. 1-10.

* cited by examiner

*Primary Examiner* — Edan Orgad
*Assistant Examiner* — Jahangir Kabir

(57) ABSTRACT

An approach for tracking documents using image processing is disclosed. Auxiliary information corresponding to compressed digital information is extracted. The auxiliary information is used to output text lines, which undergo a hash function (e.g., checksum operation). In this manner, individual hash values are generated, as well as an overall hash value of the entire file of text lines. A reference set of hash values are maintained to identify other compressed digital information.

17 Claims, 7 Drawing Sheets ially, the compressed digital information 103 can be in a JPEG (Joint Pho-
METHOD AND SYSTEM FOR PROVIDING IMAGE PROCESSING TO TRACK DIGITAL INFORMATION

BACKGROUND INFORMATION

With the proliferation of computers and networking technologies, users are able to generate and share an inordinate number of files, representing documents, audio, images and video as well as any such combination. Moreover, many versions of the documents and files may exist. Consequently, management of these documents and files poses a tremendous challenge. Traditional text-based tracking and searching of documents are ineffective, if the document includes images, for instance. Also, searches for images are confined to the textual information describing the images, not the images themselves. This is so because conventional image processing approaches are computationally expensive.

Therefore, there is a need for an improved approach for tracking documents and files using image processing techniques.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF PREFERRED EMBODIMENTS

An apparatus, method, and software for providing image processing to track digital information are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments of the present invention are described with respect to files representing documents, it is contemplated that these embodiments have applicability to tracking of compressed digital information, in general.

Figure 1:
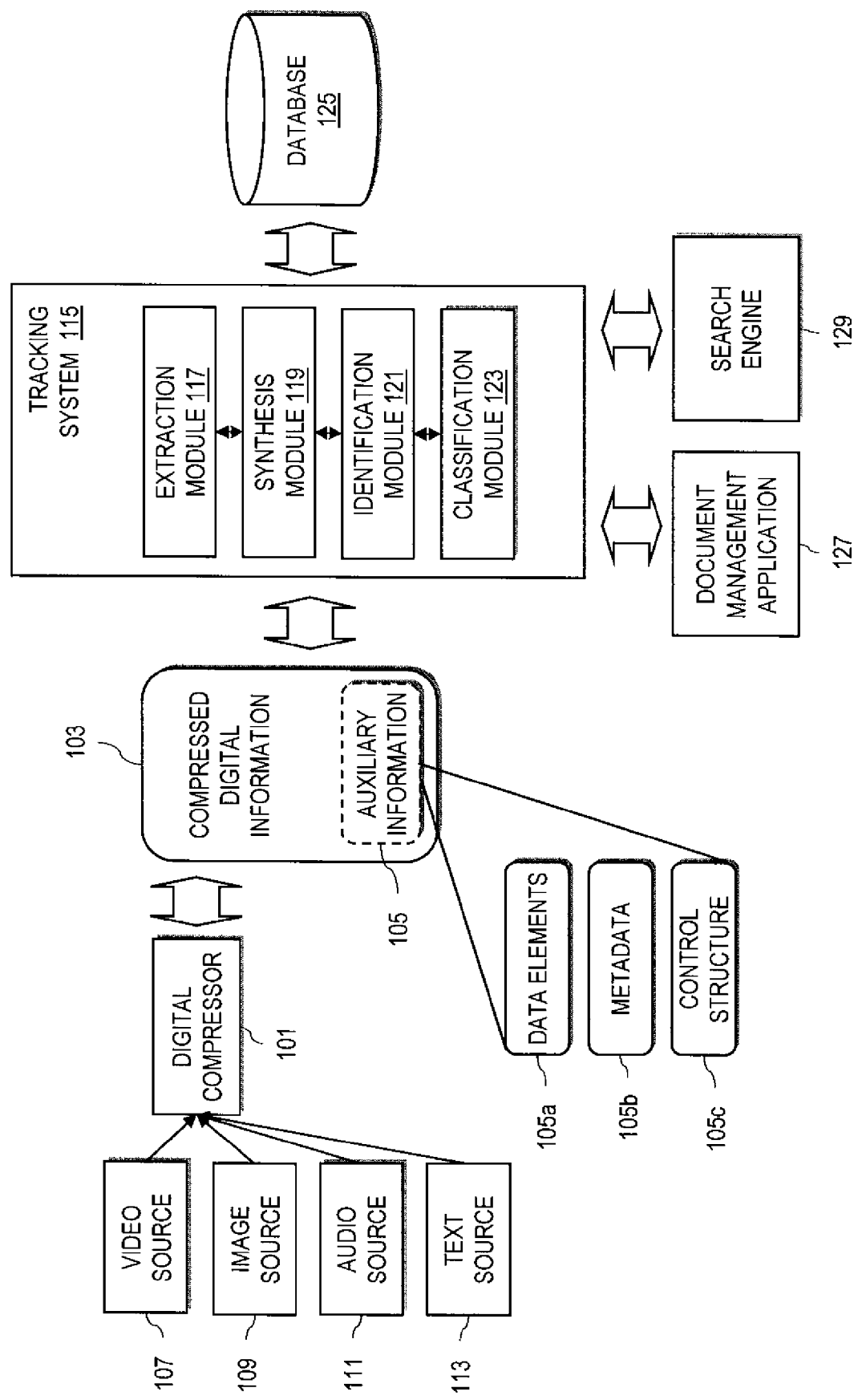
FIG. 1 is a diagram of a tracking system capable of processing compressed digital information, in accordance with an embodiment of the present invention.

FIG. 1 is a diagram of a tracking system capable of processing compressed digital information, in accordance with an embodiment of the present invention. In this example, a digital compressor 101 outputs compressed digital information 103 and associated auxiliary information 105. The source of the information 103 can be of any type, including a video source 107, an image source 109, and audio source 111, or a text source 113. In the case of a video feed, the digital compressor 101 would output the compressed digital information 103 in form of a digital video format, such as MPEG (Motion Picture Experts Group), MPEG-2, etc. Alternatively, the compressed digital information 103 can be in a JPEG (Joint Photographic Experts Group) format, if the source is the image source 109 or the text source 113. This file format is a commonly used format for efficiently storing and transmitting digital still images. The audio source can 111 yield an MP3 (Motion Picture Experts Group Layer-3) format. The text source 113 can be a word processor (or other text-based applications), speech-to-text application, etc.

As shown, the compressed digital information 103 has an associated auxiliary information 105 that conveys information pertaining to the compressed digital information 103. By way of example, the auxiliary information 105 includes data elements 105a, metadata 105b, and control structure information 105c. The metadata 105b, in an exemplary embodiment, provides information about the compression scheme used to generate the compressed digital information 103.

With respect to JPEG, for instance, this technique uses a set of control, calibration and management data imbedded in the image files. These information is described in ITU Recommendation T.81 *"Information Technology Digital Compression and Coding of Continuous Still Images Requirements and Guidelines"*; which is incorporated herein by reference in its entirety. This Recommendation provides a set of standards for the compression, storage and representation of photographic images in digital form. It is recognized that portions of the information produced when creating digital images leave specific traces or "fingerprints." Such identifying means or signatures can be extracted by the tracking system 115, as more fully explained later in FIGS. 2-3. Traditionally, automatic identification and classification of images is a hard problem, computationally. The ability to algorhthmatically extract, identify and classify information greatly aids in the automation of this process.

Effectively, the tracking system 115 examines a number of the data structures, performs a set of calculations, and then compares the information to a set of reference data from known imaging devices. This information can then be used to identify, for example, the make and model of the device with a high degree of certainty. The technique can also be used to determine the similarities of the cameras, scanners, etc. used to produce two different images. For example, the signatures can be used to determine whether these images originate from the same camera.

Hence, to perform this identification technique, the tracking system 115 includes an extraction module 117 to extract the auxiliary information 105 from the compressed digital information 103. The system 115 also employs a synthesis module 119 and an identification module 121, which operate in conjunction to produce unique values for the identifying the compressed digital information 103. Additionally, a classification module 123 permits the tracking system 115 to categorize (or classify) the unique values, which are indicative of various characteristics of the compressed digital information 103. For example, the compressed digital information 103 can be grouped appropriately by these characteristics. The unique values can be stored in a database 125.

As explained, the process of producing a digital picture creates data elements, metadata and control structures in addition to the image specific information. This information, while built according to industry standards, has structural and content information, which can be used to identify the specific make and model of the device used to capture the image. Extraction and synthesis of the metadata and control structures to identify the image device is not intentionally supported by the standard, but is an artifact of the flexibility, and ambiguity of the standards and opportunity for multiple compliant and interoperable implementations. It requires a sophisticated combination and synthesis of the metadata and control information in a JPEG file to perform the identification.

The tracking system 115 can support a variety of applications. As seen, one such application is a document management application 127 to support automatic identification of document or portofolio relationships. By being able to identify specific images through computationally efficient means, the examination and association of images within documents can be made viable. The capability to draw associations between image sources automatically from the auxiliary information enables the accurate tracking of a number of forms of document relationships (e.g., locating an earlier version of a document) In addition, a search engine application 129 can take advantage of the tracking system's capability to provide automated tracking and indexing of images, as explained more fully in FIG. 6.

As alluded to earlier, other applications can involve identification of cameras for forensic purposes. For example, the tracking system 115 can be implemented to identify the make an model of a camera used to take a specific picture can be of us in law enforcement, copyright disputes and validation of intellectual property claims.

Figure 2:
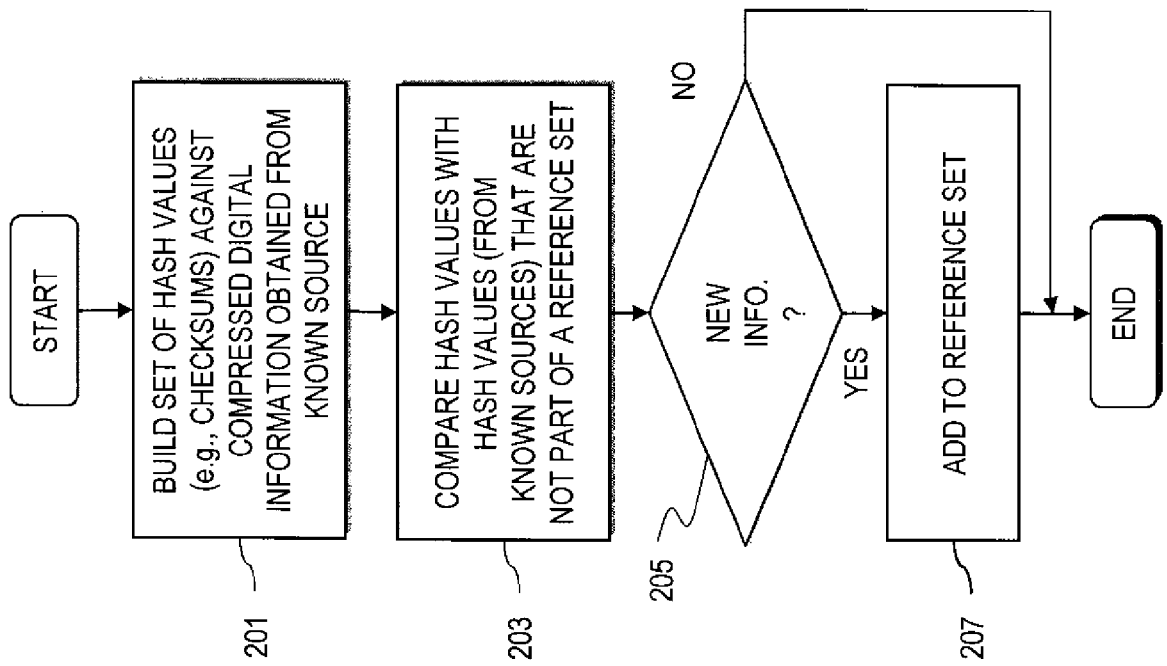
FIG. 2 is a flowchart of a process for generating a reference set of hash values used to identify digital information, according to an embodiment of the present invention.

The operation of the tracking system 115 is now described with respect to FIG. 2.

FIG. 2 is a flowchart of a process for generating a reference set of hash values used to identify digital information, according to an embodiment of the present invention. The tracking system 115, as in step 201, builds a set of unique values, e.g., hash values, against the compressed digital information 103 obtained from a known source. In an exemplary embodiment, the hash values are checksums, which can be produced using any standard routine (e.g., UNIX checksum command).

"Checksum" is an acronym for SUMmation CHECK performed as an error-checking mechanism. For instance, bits within of a digital file are summed, as to provide a "signature" for the file. That is, a number is computed based on all of the characters in the file. Another characteristic of such a number, or checksum, is that it changes with high probability, if any character in the file is changed. A number of standard algorithms have been developed to generate checksums; for example, a cyclic redundancy checksum (CRC).

In step 203, the hash values (e.g., checksums) are compared with hash values from known sources; also, these hash values from the known sources are not part of a reference set. It is noted that not all hash values from the known sources are used to form the reference set. The reference set serves as a statistical control set. This comparison step ensures that the reference set is sparse, as to minimize processing time. If it is determined that new information is provided by the hash values, per step 205, the particular hash values are added to the reference set of hash values. That is, as each new image is compared, it will be added to the reference set, as in step 207, if it provides new information.

Figure 3:
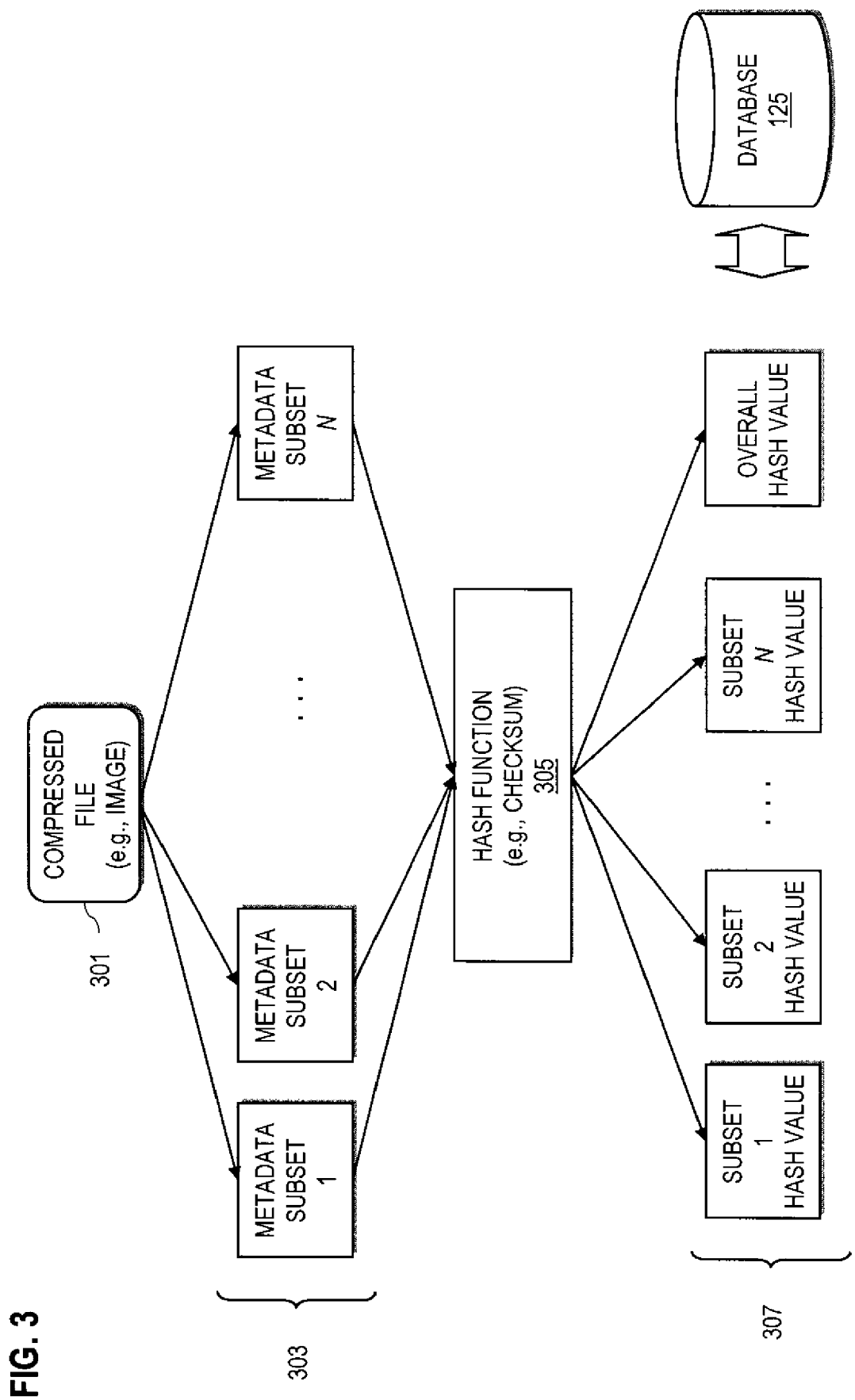
FIG. 3 is a diagram showing a hash function for generating a reference set of hash values, in accordance with an embodiment of the present invention.

FIG. 3 is a diagram showing a hash function for generating a reference set of hash values, in accordance with an embodiment of the present invention. Under this scenario, a compressed file (e.g., image file) has an associated metadata that is partitioned into metadata subsets 303. Depending on the application, any number of subsets, N (an integer), can be utilized. Each of the metadata subsets 303 are then fed to a hash function (e.g., checksum) 305 to output a series of hash value subsets 307. In addition to the individual hash values corresponding to the metadata subsets 303, an overall hash value is produced by the hash function 305. These values 307 are then stored in the database 125 for comparisons to hash values of unknown files.

With the above process, transporting an image via mechanisms that explicitly reformat the image does not alter the checksum.

Figure 4:
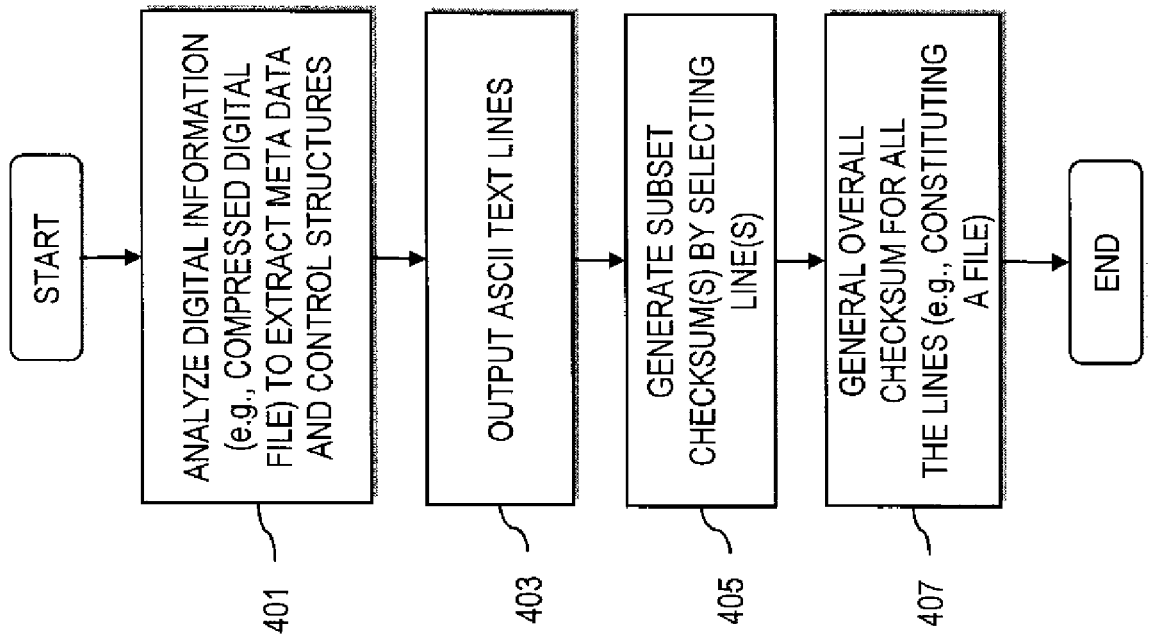
FIG. 4 is a flowchart of a process for generating subsets of hash values, according to an embodiment of the present invention.

FIG. 4 is a flowchart of a process for generating subsets of hash values, according to an embodiment of the present invention. For the purposes of illustration, the compressed digital information 103 is a JPEG file. Using the process of FIG. 2, the initial reference set is created. For example, the reference data set includes the checksums for a set of images generated by known imagers (e.g., camera phones, digital cameras, image processors, scanners, etc.). The set of checksums cover the types of information in the JPEG file that have the potential to discriminate between imagers. This information is the set of fields that do not vary between images from the same imager. The tracking system 115 uses checksums that cover a variety of subsets of the data along with an overall checksum that covers the entire set.

For each image to be part of the reference set, the checksums are generated as follows. First, in step 401, the file is analyzed by the extraction module 117, which extracts the non-image-specific portions of the JPEG image as a set of ASCII text lines (step 403). Each line has a classification field at the beginning that indicates the portion of the JPEG file it comes from. Subset checksums are generated by selecting lines from the file based on their classification field, then checksumming the lines selected, per step 405. Since the subset checksums are present just to indicate which portions of the JPEG image have the most value, the specific subsets used are not of particular concern. The overall checksum is generated using, for instance, the Unix checksumming program on this output file, as in step 407.

Figure 5:
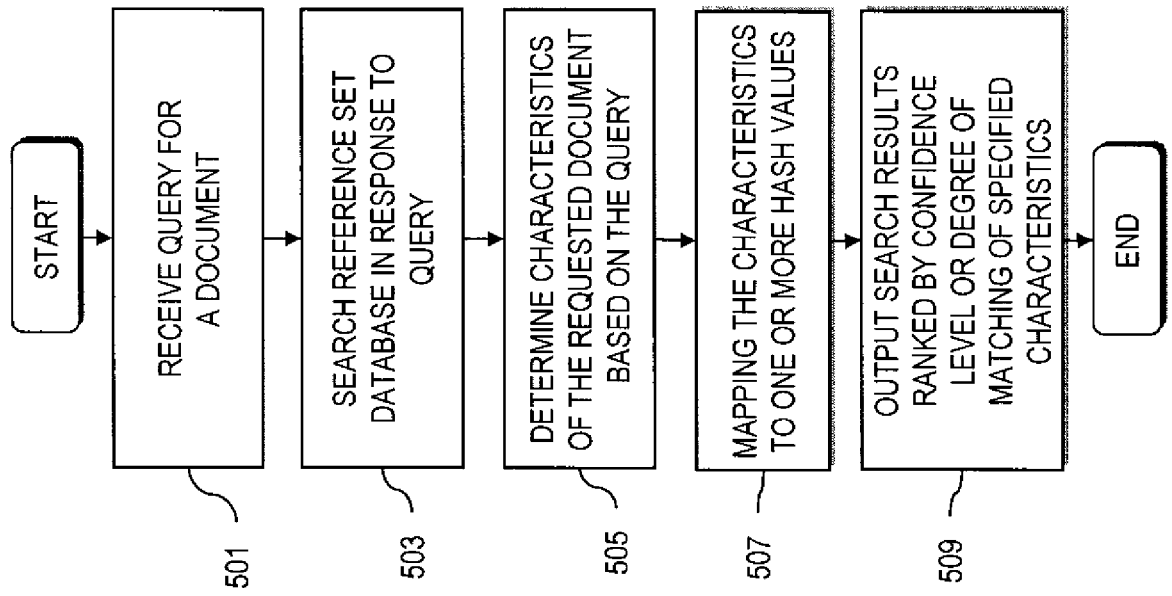
FIG. 5 is a flowchart of a process for tracking documents, according to an embodiment of the present invention.

FIG. 5 is a flowchart of a process for tracking documents, according to an embodiment of the present invention. In this example, the document management application 127 (FIG. 1) permits users to readily track documents by operating with the tracking system 115 to input, identify, and classify documents. In step 501, a query is received by the application 127 for a document. This query is forwarded to the tracking system 115, which determines characteristics (i.e., search parameters) of the requested document based on the received query, as in step 503. These characteristics are mapped to one or more hash values, per step 505. The database 125 then searches the stored reference set of hash values (step 507). In step 509, the search results are supplied to the document management application 127, which can output the results in an order that is meaning to the user. For example, the search results can be ranked by confidence level or degree of matching.

Figure 6:
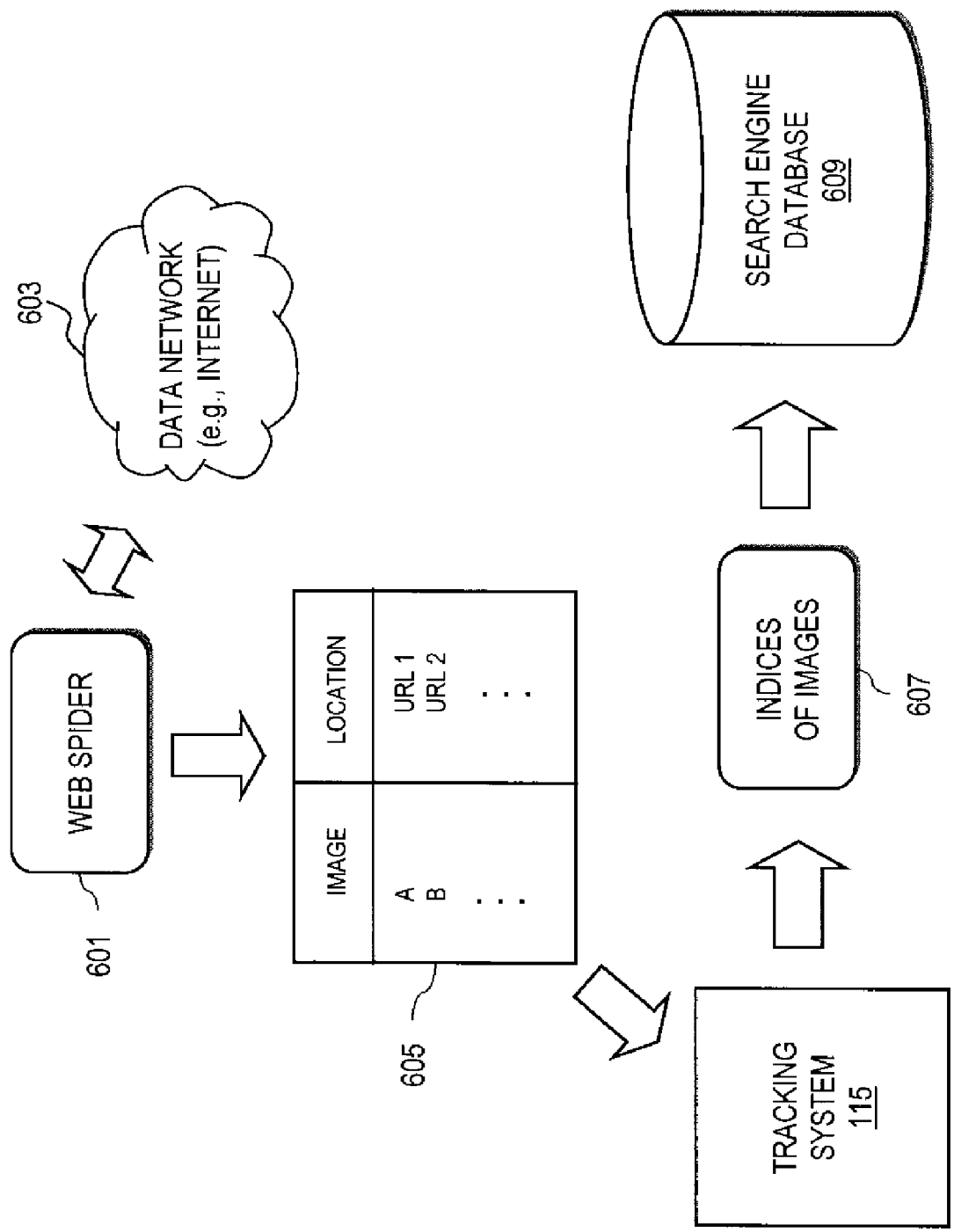
FIG. 6 is a diagram of a search engine process utilizing the indices generated by the tracking system of FIG. 1, according to an embodiment of the present invention.

FIG. 6 is a diagram of a search engine process utilizing the indices generated by the tracking system of FIG. 1, according to an embodiment of the present invention. By way of example, the search engine application 129 is a web-based search engine and employs a web spider 601 to build a list of images found within the World Wide Web—i.e., data network 603. The spider 601 is a robot program that traverses web servers (not shown) within the Internet 603 and generates a list 605 of words surrounding images and the location of such words.

The generated list 605 is fed to the tracking system 115, which outputs indices 607 of the images by retrieving the images specified in the list 605 and using the processes of FIGS. 2-4. These indices 607 are then stored within a search engine database 609 for access by the search engine application 129.

As described, in addition to the document tracking and search engine applications, the imaging process of the tracking system 115 has broad applicability to other applications, stemming from the computational efficiency of this process.

The processes described herein for providing image processing and tracking may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
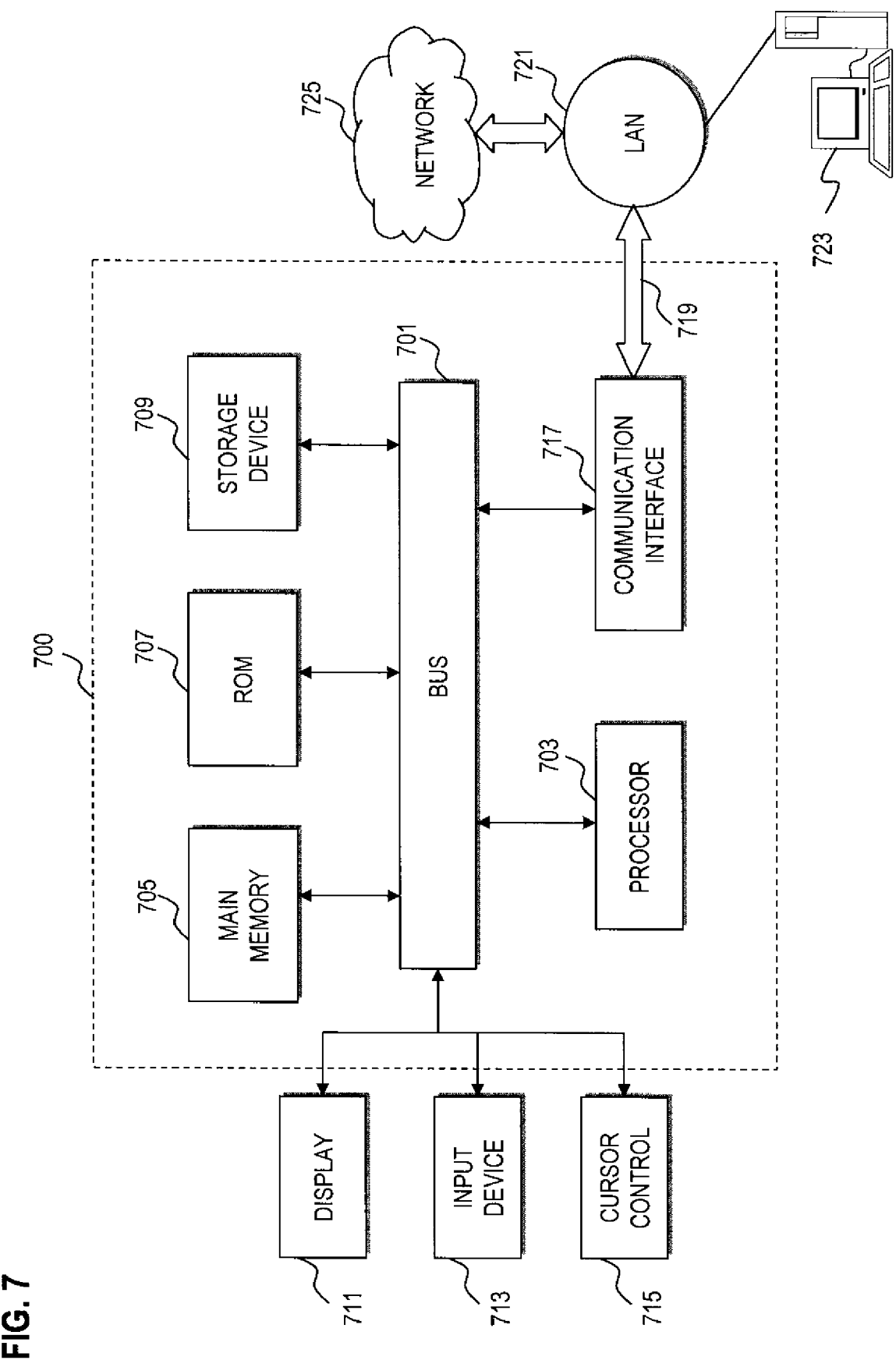
FIG. 7 is a diagram of a computer system that can be used to implement various embodiments of the present invention.

FIG. 7 illustrates a computer system 700 upon which an embodiment according to the present invention can be implemented. For example, the processes described herein can be implemented using the computer system 700. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the present invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   obtaining, by a computer processor, auxiliary information corresponding to a one digital file comprising compressed digital information;
   outputting, by the computer processor, a plurality of text lines based on the auxiliary information, wherein one or more of the text lines includes a classification field that indicates a portion of the one digital file;
   generating, by the computer processor, all individual hash value for a subset of the text lines using a hash function, the subset of the text lines being selected based on the associated classification field; and
   generating, by the computer processor, an overall hash value for the plurality of text lines, wherein the individual hash value and the overall hash value are selectively included in a reference set of hash values to identify one or more relationships between the one digital file and another digital file comprising compressed digital information.

2. A method according to claim 1, wherein the hash function is performed using a checksum scheme.

3. A method according to claim 1, further comprising:
   receiving, by the computer processor, the other digital file associated with a text document;
   extracting, by the computer processor, auxiliary information from the other digital file;
   generating, by the computer processor, one or more hash values for the other digital file using the auxiliary information from the other digital file;
   comparing, by the computer processor, the hash values of the other digital file with the the reference set; and
   outputting, by the computer processor, a search result of matching digital files based on the comparison.

4. A method according to claim 1, further comprising:
   tracking the one digital file based on the corresponding hash values.

5. A method according to claim 1, wherein the one digital file comprises one of an image, audio, or video, and the reference set of hash values is generated from a known source of the compressed digital information.

6. A method according to claim 1, wherein the auxiliary information includes metadata specifying information associated with a compression process used to produce the compressed digital information.

7. An apparatus comprising:
   a processor configured to execute,
   an extraction module configured to obtain auxiliary information corresponding to a one file comprising compressed digital information;
   a synthesis module configured to output a plurality of text lines based on the auxiliary information, wherein one or more of the text lines includes a classification field that indicates a portion of the one digital file; and
   an identification module configured to generate an individual hash value for a subset of the text lines using a hash function, the subset of the text lines being selected based on the associated classification field, and to generate an overall hash value for the plurality of text lines, wherein the individual hash value and the overall hash value are selectively included in a reference set of hash values to identify one or more relationships between the one file and another file comprising compressed digital information.

8. An apparatus according to claim 7, wherein the hash function is performed using a checksum scheme.

9. An apparatus according to claim 7, wherein
   the extraction module is further configured to extract auxiliary information from the other digital file associated with a text document,
   the identification module is further configured to generate one or more hash values for the other digital file using the auxiliary information from the other digital file, to compare the hash values for the other digital file with the reference set, and
   the processor is further configured to output a search result of matching digital files based on the comparison.

10. An apparatus according to claim 7, wherein the the processor is further configured to execute tracking of the one digital file based on the corresponding hash values.

11. An apparatus according to claim 7, wherein the one digital file represents one of an image, audio, or video, and the reference set of hash values is generated from a known source of the compressed digital information.

12. An apparatus according to claim 7, wherein the auxiliary information includes metadata specifying information associated with a compression process used to produce the compressed digital information.

13. A method comprising:
   receiving, by a computer processor, a query for a requested document;
   determining, by the computer processor, characteristics of the requested document based on the query;
   mapping, by the computer processor, the characteristics to one or more hash values;
   searching, by the computer processor, a database configured to store a reference set of hash values corresponding to one or more documents, using the one or more hash values, wherein the reference set of hash values was generated by a process including applying a hash function to auxiliary information extracted from one or more digital files comprising compressed digital information of the one or more documents; and outputting, by the computer processor, a search result in response to the query, wherein for each one of the one or more documents, the process for the generation of the reference set of hash values further includes, outputting, by the computer processor, a plurality of text lines based on the corresponding auxiliary information, wherein one or more of the text lines includes a classification field that indicates a portion of the one or more digital files, generating, by the computer processor, an individual hash value for a subset of the text lines using the hash function, the subset of the text lines being selected based on the associated classification field, and generating, by the computer processor, an overall hash value for the plurality of text lines.

14. A method according to claim 13, wherein for each one of the one or more documents, the process for the generation of the reference set of hash values further includes, outputting, by the computer processor, a plurality of text lines based on the corresponding auxiliary information, generating, by the computer processor, an individual hash value for a subset of the text lines using the hash function, and generating, by the computer processor, an overall hash value for the plurality of text lines.

15. A method according to claim 13, wherein the hash function is performed using a checksum scheme.

16. A method according to claim 13, wherein each of the digital files represents one of an image, audio, or video.

17. A method according to claim 13, wherein the auxiliary information includes metadata specifying information associated with a compression process used to produce the corresponding compressed digital file.

\* \* \* \* \*